Dec. 2, 1924.
M. R. SMITH
HEADLIGHT
Filed Sept. 24, 1923
1,518,012
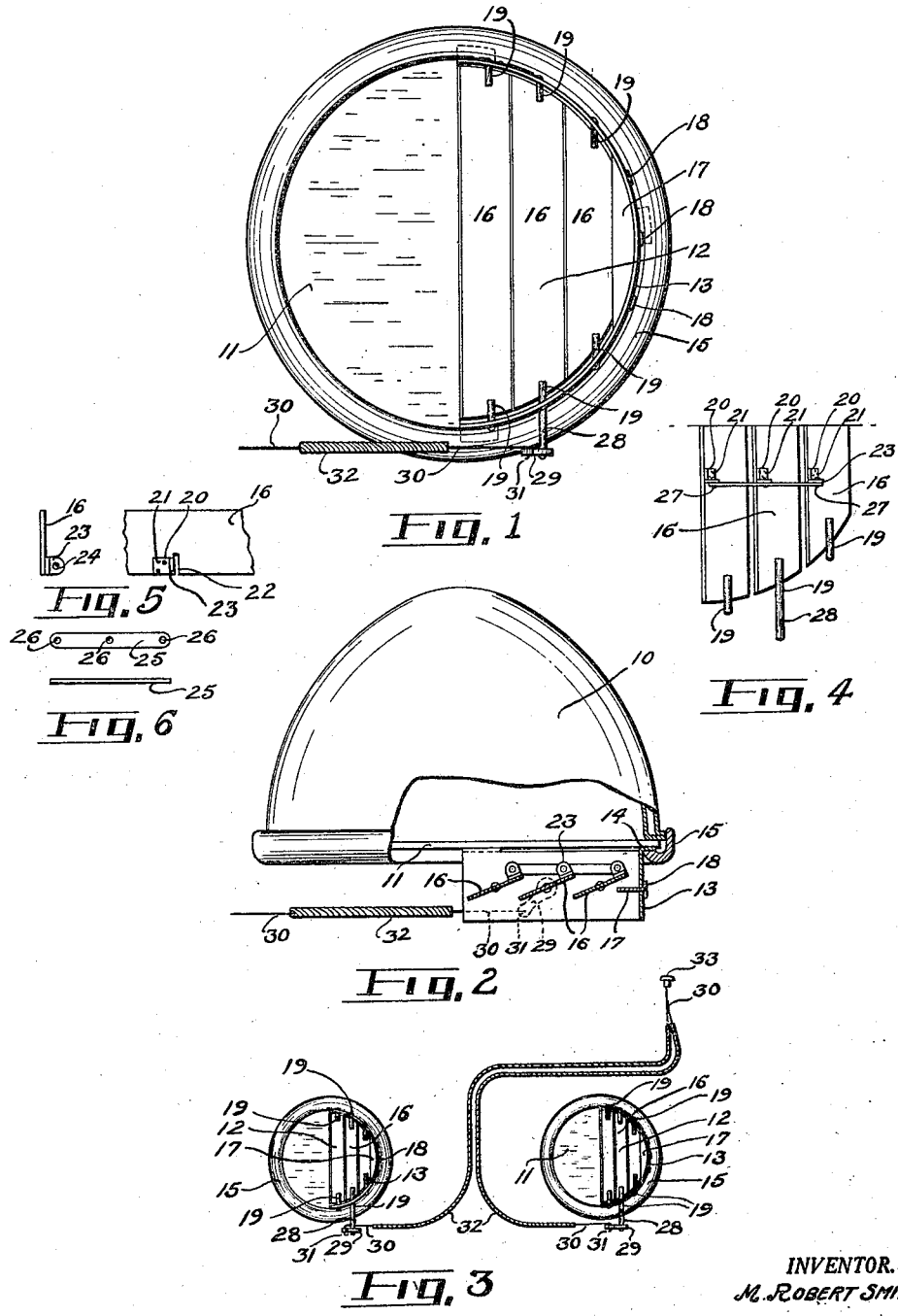
INVENTOR.
M. ROBERT SMITH.
BY
G. H. Braddock
ATTORNEY.

Patented Dec. 2, 1924.

1,518,012

UNITED STATES PATENT OFFICE.

MELVIN ROBERT SMITH, OF RIDGEFIELD, CONNECTICUT.

HEADLIGHT.

Application filed September 24, 1923. Serial No. 664,383.

*To all whom it may concern:*

Be it known that MELVIN ROBERT SMITH, a citizen of the United States, and resident of Ridgefield, in the county of Fairfield and State of Connecticut, has invented certain new and useful Improvements in Headlights, of which the following is a specification.

This invention relates to a headlight, and has more particular reference to a headlight equipped with a novel device for deflecting rays of light ordinarily thrown into the eyes of an approaching driver.

The object of the invention is to provide a simple and practical deflector for the purpose stated which will be associated with an ordinary headlight to produce an improved headlight (1) capable of allowing a full volume of light to be ordinarily projected and (2) capable of shading or deflecting light from the eyes of an approaching driver without diminishing to an appreciable extent the volume of light ordinarily projected.

Specifically, the headlight of the present invention is an improvement over headlights and shades of the type of those disclosed in the following United States patents: No. 1,353,890, Cappelen, September 28, 1920; and 1,403,496, Higert, January 17, 1922.

With the above objects in view, as well as others which will appear as the specification proceeds, the invention comprises the construction, arrangement and combination of parts as now to be fully described and as hereinafter to be specifically claimed, it being understood that the disclosure herein is merely illustrative of the principles of the invention and meant in no way in a limiting sense, changes in details of construction and arrangement of parts being permissible so long as within the scope of the appended claims.

In the accompanying drawing forming a part of this specification,

Fig. 1 is a front elevation of the novel headlight;

Fig. 2 is a top plan view thereof, partially broken away and partially in section;

Fig. 3 is a diagrammatic view, illustrating a pair of headlights in front elevation and disclosing the deflector of each light and means for operating the deflectors;

Fig. 4 is a detail of the adjustable deflector panels, more clearly showing the manner in which said panels are connected to be manipulated;

Fig. 5 is a detail disclosing an adjustable panel in end elevation and in plan, the plan view showing only a fragment of the panel; and Fig. 6 is a detail of the link connecting the adjustable deflector panels, including a plan and an edge view of said link.

With respect to the drawing and the numerals of reference indicated thereon, 10 denotes a headlight which may be of ordinary or preferred construction, 11 the lens of said headlight, and 12 represents, generally, the deflector of the invention.

As very clearly disclosed, the deflector includes a frame or rim 13, preferably of semi-circular conformation, having a flange 14 clamped, together with the lens 11, between the headlight 10 and lens holder 15 desirably removably secured to the headlight. The rim of the deflector is preferably secured to that side of the headlight which is to be at the left when the headlight is set up for use, this for a purpose to be fully explained, and is arranged to protrude forwardly of the headlight.

Numeral 16 denotes adjustable panels, three being shown, and 17 represents a fixed panel, all of said panels being secured or mounted in said rim to be vertical when the headlight is in use. The fixed panel 17 is designed to lie contiguous with the inner face of the frame or rim at or adjacent to the central portion of the length of said inner face, and to this end said fixed panel has an outer edge curved to fit said inner face as will be apparent. The panel 17 can be secured to the frame or rim in any manner, as by means of lugs 18 passing through slots in said frame or rim and bent down against the same. The adjustable panels 16 are rotatably mounted in the frame or rim, each adjustable panel having pivot pins 19 in its opposite ends, preferably arranged centrally of said ends, snugly entering holes in the frame or rim, and all of the panels are desirably of the same width.

The adjustable panels are adapted to be rotated in the frame or rim so that their widths can be parallel or nearly parallel with rays of light passing from the interior of the headlight, as shown in Fig. 4, or can interlap with each other and with the fixed panel to wholly or partially cut off said rays of light, as shown in Figs. 1, 2 and 3, and each adjustable panel has its opposite ends curved as shown to closely fit the rim.

Mechanism shown more clearly in Figs. 2, 4, 5 and 6, is provided for simultaneously and similarly manipulating all of the adjustable panels. Of this mechanism, 20 denotes small L-shape brackets, one secured to each adjustable panel in any suitable manner, as at 21, adjacent an edge and intermediate the ends thereof, and 22 indicates a transverse slot in an edge of each of two of the panels adjacent the upstanding arms 23 of their brackets. Each upstanding arm has an opening 24. 25 is a link having spaced apart openings 26, the distances between the openings, as well as the distances between adjacent pivots of different panels, being equal. 27 represents bolts, rivets, or the like, rotatably securing the arms 23 to said link, there being one bolt or rivet for each arm and entering each opening 26.

One of the pins 19 of the adjustable panels, preferably the pin shown, has an extension 28 upon which a short lever 29 is fixed. 30 represents a relatively stiff wire secured to the lever in any suitable manner as at 31, 32 a conduit, which is flexible as shown, slidably receiving the wire, and 33 denotes an operating button or handle secured to said wire. Obviously, sliding of the wire in its conduit will actuate the lever to simultaneously rotate the adjustable deflector panels on their pivots.

In Fig. 3 I have disclosed a pair of headlights relatively positioned as in use, there being a single button or handle 33 arranged to manipulate two wires 30, whereby all of the adjustable panels of both headlights can be simultaneously and similarly manipulated. The novel deflector, in each instance, is at the left to deflect direct rays of light from the eyes of an approaching driver.

The manner in which the headlights function is obvious. It is to be noted that the deflector panel pivots are arranged centrally of the widths of said panels, whereby but a slight rotation of the panels is required to move them from open to deflecting positions, or vice versa. And it is to be further noted that when the adjustable panels are in deflecting positions they are not necessarily completely closed. On the contrary, said panels may be adjusted to slightly deflect direct rays of light from straight ahead to one side, to accomplish the purpose set out to be accomplished, without diminishing to an appreciable extent the total volume of light passing from the reflector of the headlight. See Fig. 2. Such deflected rays, naturally, fall upon the roadway ahead and adjacent passing and approaching vehicles. This is not the case in devices having a single shade member for shading one side or the other of a headlight. Such shades must be closed, or approximately closed, to obscure one side of a headlight. Otherwise, the main object sought to be accomplished is defeated.

The deflecting faces of the adjustable panels, adjacent the reflecting surface of the headlight, are preferably themselves constructed to be reflectors, whereby the deflected rays of light are not in any way diminished but are projected ahead. It is apparent that the position to which said adjustable panels are adjusted determines the direction of projection of all of said rays of light. That is, the closer said panels are moved toward closed position, the greater the angle of deflection of said rays.

It is to be understood that the novel deflecting device can be set up for use, and will be serviceable even though not adjustable, by providing panels as illustrated and described permanently set to that position just precluding the direct passage ahead of direct rays of light, allowing slightly deflected shells of rays of light to be freely projected forwardly but to one side of the lamp. It is of course understood that the mechanism whereby the panels are adjustable as shown is adapted to insure that said panels will not accidentally become displaced from any position to which adjusted.

Having thus fully described the invention, what I claim as new and desire to secure by Letters Patent is:

1. The combination with a headlight, of a deflector mounted in advance of the reflector thereof, said deflector including a semi-circular frame projecting forwardly of said headlight and arranged to fit one side thereof, adjustable vertical panels mounted in said frame and having pivots at the midwidths of their opposite ends, and mechanism for simultaneously and similarly manipulating said panels on their pivots.

2. The combination with a headlight of a deflector mounted in advance of the reflector thereof, said deflector including a semi-circular frame projecting forwardly of said headlight and arranged to fit one side thereof, adjustable vertical panels mounted in said frame and having pivots at the midwidths of their opposite ends, mechanism for simultaneously and similarly manipulating said panels on their pivots, and a fixed vertical panel in said frame and fitting the midlength thereof, said fixed panel lying adjacent one of said adjustable panels.

Signed at Bridgeport, in the county of Fairfield, and State of Connecticut, this 22nd day of September, A. D., 1923.

M. ROBERT SMITH.